(12) United States Patent
Zakharov et al.

(10) Patent No.: US 11,030,447 B2
(45) Date of Patent: *Jun. 8, 2021

(54) ON-DEVICE PARTIAL RECOGNITION SYSTEMS AND METHODS

(71) Applicant: Open Text Corporation, Waterloo (CA)

(72) Inventors: Mikhail Yurievitch Zakharov, Saint-Petersburg (RU); Kirill Vaniukov, Saint-Petersburg (RU); Christopher Dale Lund, San Diego, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/001,646

(22) Filed: Aug. 24, 2020

(65) Prior Publication Data

US 2020/0387701 A1 Dec. 10, 2020

Related U.S. Application Data

(63) Continuation of application No. 16/133,151, filed on Sep. 17, 2018, now Pat. No. 10,755,090.

(30) Foreign Application Priority Data

Mar. 16, 2018 (RU) .......................... RU2018109386

(51) Int. Cl.
*G06K 9/20* (2006.01)
*G06K 9/00* (2006.01)
(Continued)

(52) U.S. Cl.
CPC ......... *G06K 9/00456* (2013.01); *G06K 9/183* (2013.01); *G06K 9/2081* (2013.01); *G06T 11/001* (2013.01); *G06K 2209/01* (2013.01)

(58) Field of Classification Search
CPC ............. G06K 9/00456; G06K 9/2081; G06K 2209/01; G06K 9/346; G06K 9/00979; G06T 11/001
See application file for complete search history.

(56) References Cited

U.S. PATENT DOCUMENTS 9,477,836 B1 * 10/2016 Ramam ................ G06F 21/6263
10,755,090 B2 * 8/2020 Zakharov ............. G06T 11/001
(Continued)

OTHER PUBLICATIONS

International Search Report and Written Opinion issued for PCT Application No. PCT/IB2018/057362, dated Jan. 4, 2019, 8 pages.
(Continued)

*Primary Examiner* — Dhaval V Patel
(74) *Attorney, Agent, or Firm* — Sprinkle IP Law Group

(57) ABSTRACT

Disclosed is an approach of on-device partial recognition that includes performing partial recognition on an image of a document captured by a mobile device to detect and/or recognize a specific area (e.g., barcodes, non-relevant text, etc.) and filling the recognized area with a solid color. Because the solid color area has a maximum compression ratio, this approach can lead to image size reduction and increased network throughput for client-server based data recognition where further processing such as advanced data extraction is performed at the server side. The approach can be enforced with neural network algorithms to exclude non-relevant information (e.g., logos, phrases, words, etc.).

20 Claims, 8 Drawing Sheets

(51) Int. Cl.
 G06T 11/00 (2006.01)
 G06K 9/18 (2006.01)

(56) References Cited

U.S. PATENT DOCUMENTS

| | | |
|---|---|---|
| 2003/0120478 A1 | 6/2003 | Palquist |
| 2004/0101196 A1 | 5/2004 | Weitman |
| 2008/0118162 A1* | 5/2008 | Siegemund ........ G06K 9/00973 |
| | | 382/229 |
| 2013/0063620 A1 | 3/2013 | Kim |
| 2014/0355069 A1* | 12/2014 | Caton .................. G06F 3/1238 |
| | | 358/3.28 |
| 2017/0317983 A1 | 11/2017 | Kompalli |

OTHER PUBLICATIONS

Office Action for U.S. Appl. No. 16/133,151, dated Jan. 17, 2020, 13 pages.
Notice of Allowance for U.S. Appl. No. 16/133,151, dated Apr. 20, 2020, 5 pages.
International Preliminary Report on Patentability issued for PCT Application No. PCT/IB2018/057362, dated Oct. 1, 2020, 6 pages.

* cited by examiner

FIG. 6A

BOARDING PASS
NAME: JOHN DOE
ETKT: 07413030000554
FQTV:

| FLIGHT: | FROM: | TO: | | CLASS: | SEAT: | GATE: | BOARD: | SEQ: |
|---|---|---|---|---|---|---|---|---|
| KL 1912 | HANOVER / HAJ | AMSTERDAM / AMS | SKY PRIORITY | M | 16A | C17 | 17:45 | 031 |
| 22MAR17 | OPERATED BY: | KLM ROYAL DUTCH AIRLINES | | | | | DEP 18:15 | |
| | | | | ZONE: | | | | |
| KL 1399 | AMSTERDAM/AMS | ST PETERSBURG / LE M | | M | 21A | | 20:02 | 067 |
| 22MAR17 | OPERATED BY: | KLM ROYAL DUTCH AIRLINES | | | | | DEP 20:30 | |
| | | | | ZONE: | | | | |

MAKE SURE YOU BOARD BEFORE GATE CLOSURE. CHECK MONITORS

FIG. 6B

BOARDING PASS
NAME: JOHN DOE
ETKT: 07413030000554
FQTV:

| FLIGHT: | FROM: | TO: | | CLASS: | SEAT: | GATE: | BOARD: | SEQ: |
|---|---|---|---|---|---|---|---|---|
| KL 1912 | HANOVER / HAJ | AMSTERDAM / AMS | SKY PRIORITY | M | 16A | C17 | 17:45 | 031 |
| 22MAR17 | OPERATED BY: | KLM ROYAL DUTCH AIRLINES | | | | | DEP 18:15 | |
| | | | | ZONE: | | | | |
| KL 1399 | AMSTERDAM/AMS | ST PETERSBURG / LE M | | M | 21A | | 20:02 | 067 |
| 22MAR17 | OPERATED BY: | KLM ROYAL DUTCH AIRLINES | | | | | DEP 20:30 | |
| | | | | ZONE: | | | | |

MAKE SURE YOU BOARD BEFORE GATE CLOSURE. CHECK MONITORS

BOARDING PASS
NAME: JOHN DOE
ETKT: 0741303000554
FQTV:

| FLIGHT: | FROM: | TO: | CLASS: | SEAT: | GATE: | BOARD: | SEQ: |
|---|---|---|---|---|---|---|---|
| KL 1912 | HANOVER / HAJ | AMSTERDAM / AMS | M | 16A | C17 | 17:45 | 031 |
| 22MAR17 | OPERATED BY: | KLM ROYAL DUTCH AIRLINES | | | | DEP 18:15 | |
| | | ZONE: | | | | | |
| KL 1399 | AMSTERDAM/AMS | ST PETERSBURG / LE M | M | 21A | | 20:02 | 067 |
| 22MAR17 | OPERATED BY: | KLM ROYAL DUTCH AIRLINES | | | | DEP 20:30 | |
| | | ZONE: | | | | | |

SKY PRIORITY 605
607

FIG. 6D

BOARDING PASS
NAME: JOHN DOE
ETKT: 0741303000554
FQTV:

| FLIGHT: | FROM: | TO: | CLASS: | SEAT: | GATE: | BOARD: | SEQ: |
|---|---|---|---|---|---|---|---|
| KL 1912 | HANOVER / HAJ | AMSTERDAM / AMS | M | 16A | C17 | 17:45 | 031 |
| 22MAR17 | OPERATED BY: | KLM ROYAL DUTCH AIRLINES | | | | DEP 18:15 | |
| | | ZONE: | | | | | |
| KL 1399 | AMSTERDAM/AMS | ST PETERSBURG / LE M | M | 21A | | 20:02 | 067 |
| 22MAR17 | OPERATED BY: | KLM ROYAL DUTCH AIRLINES | | | | DEP 20:30 | |
| | | ZONE: | | | | | |

SKY PRIORITY

MAKE SURE YOU BOARD BEFORE GATE CLOSURE. CHECK MONITORS

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum opentext

0123456789

FIG. 8A

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum

ON-DEVICE PARTIAL RECOGNITION SYSTEMS AND METHODS

CROSS-REFERENCE TO RELATED APPLICATIONS

This application is a continuation of, and claims a benefit of priority under 35 U.S.C. § 120 from, U.S. patent application Ser. No. 16/133,151, filed Sep. 17, 2018, entitled "ON-DEVICE PARTIAL RECOGNITION SYSTEMS AND METHODS," which claims a benefit of priority from Russian Application No. 2018109386, filed Mar. 16, 2018, entitled "ON-DEVICE PARTIAL RECOGNITION SYSTEMS AND METHODS," which are fully incorporated by reference here for all purposes.

TECHNICAL FIELD

This disclosure relates generally to the field of data recognition. More particularly, this disclosure relates to systems, methods, and computer program products for on-device partial recognition of data.

BACKGROUND OF THE RELATED ART

Optical character recognition (OCR) refers to a field of research in pattern recognition, artificial intelligence, and computer vision. Today, the term "OCR" generally refers to a computer's ability to recognize printed letters, numerals, or symbols (i.e., optical characters) as discrete entities.

In performing an OCR process, an OCR device (e.g., a special computing device such as a handheld scanner with built-in OCR software) works with a scanning device or camera that first captures an image of a printed page. The OCR software is operable to analyze the image and attempt to identify any optical characters from the image, for instance, by pattern matching.

Depending upon many factors such as the quality of the printed material, the quality of the image, the complexity of the image itself, etc., accuracy of OCR outputs may vary widely from one OCR device to another. Because even a single character error can lead to a loss of meaning or misinterpreting context, OCR accuracy can be critically important in some cases.

For example, enterprises often use OCR to reduce human data entry, save time, and reduce human errors. In such cases, high quality OCR which can produce perfect results is not only desired, but may also be required, for instance, for regulation compliance reasons. Due to the computational power needed, high quality OCR is typically performed at the server side, for example, on an OCR server operating in an enterprise computing environment.

With the advent of the Internet and Internet-connected mobile devices such as mobile phones and tablets, OCR can be used by mobile device applications to extract text captured using a mobile device's camera. For example, a mobile device application running on a mobile device may send (e.g., through an OCR application programming interface (API)) an image file captured by the mobile device to an OCR server computer for further processing. The OCR server may analyze the image file and extract text from the image file.

In some cases, the image file may be compressed to reduce the file size and thus improve throughput. However, the reduction in file size is inversely related to the quality of the image. That is, while reducing the file size of an image may increase the speed by which an OCR result can be obtained, the OCR result may be less than perfect due to the reduced image quality caused by the file size reduction. For applications where highly accurate OCR results are desired or needed, the image size can be very important. As a result, high quality OCR operations usually have lower throughput, particularly when image data is transmitted over a network.

In view of the foregoing, there is room for innovations and improvements in the field of data recognition.

SUMMARY OF THE DISCLOSURE

An object of the invention is to improve data recognition performed by mobile devices. In some embodiments, this object can be realized in a method for on-device partial recognition in a client-server process.

In some embodiments, the method may include performing, by a recognition module running on a user device, a partial recognition on an image of a document captured by the user device. The document may have various types of printed content such as a barcode, text (e.g., words, numbers, symbols, etc.), photograph, drawings, or a combination thereof.

In some embodiments, the partial recognition comprises performing on-device OCR on the image. The on-device OCR may be configured for a low resolution fast scan, for example, at 72 pixels per inch (PPI). OCR technologies are known to those skilled in the art and thus are not further described herein.

In some embodiments, the partial recognition further comprises performing barcode recognition on the image. A barcode (or bar code) is an optical, machine-readable, representation of data. There are different types of barcodes. As an example, a linear or one-dimensional barcode may systematically represent data by varying the widths and spacing of parallel lines, while a two-dimensional barcode may represent data using black squares arranged in a square grid on a white background. Barcode recognition technologies are known to those skilled in the art and thus are not further described herein.

In some embodiments, the partial recognition may further comprise non-relevant information detection. In such cases, the recognition module may first perform OCR on the image to find the content and placement of lines of text. This can be a fast scan sufficient to recognize what's generally contained in the document. Using a set of rules pertaining to phrases, patterns, or a combination thereof, the recognition module may operate to perform "fuzzy matching" and identify non-relevant information such as a word and/or phrase that is similar to what is specified in the set of rules. In this way, the recognized image data produced by the partial recognition can include a portion of the image containing a barcode printed on the document, non-relevant information, or a combination thereof.

In some embodiments, the method may further include, providing, by the recognition module, the portion of the image containing the barcode and/or non-relevant information to a cut-and-fill module running on the user device. In some embodiments, the cut-and-fill module may operate to generate a modified image of the document by, for instance, cutting the portion of the image containing the barcode and/or non-relevant information from the image and filling the portion of the image with a solid color.

In some embodiments, the method may further include providing, by the cut-and-fill module, the modified image of the document to an image compressor running on the user device. In some embodiments, the image compressor may operate to compress the modified image of the document to produce a compressed modified image of the document. In some embodiments, the image compressor is configured for performing a lossy compression, a lossless compression, or a combination thereof.

In some embodiments, the method may further include sending the compressed modified image of the document to a recognition server over a network connection. The recognition server can be a document conversion server particularly configured for automated, enterprise-class, high-volume document transformation, capable of converting a document from a source format to one or more target formats, while maintaining high fidelity of its outputs.

In some embodiments, a result from the partial recognition performed by the recognition module is sent along with the compressed modified image of the document to the recognition server. In response, the recognition server may operate to perform an image-to-text recognition on the compressed modified image of the document. Depending upon specific use case, recognized data can be returned to the user device and/or further processed at the server side (e.g., by the recognition server and/or a computing facility downstream from the recognition server).

In some embodiments, the partial recognition is performed automatically when an image of a document is captured by the user device. In some embodiments, the partial recognition is performed responsive to an instruction from a user of the user device.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 6A shows an example of an image of a type of document that may contain a barcode.

FIG. 6B shows a modified image of FIG. 6A where the barcode had been recognized, cut from the original image, and replaced by a solid color, according to some embodiments.

FIG. 6C shows a modified image of FIG. 6A where, in addition to the barcode, a non-relevant phrase had been recognized, cut from the original image, and replaced by a solid color, according to some embodiments.

FIG. 6D shows a modified image of FIG. 6A where image enhancement had been applied in addition to the barcode being recognized, cut from the original image, and replaced by a solid color, according to some embodiments.

FIG. 8A shows an image of a type of document that may contain multiple types of information including text, a barcode, and a logo.

FIG. 8B shows a modified image of FIG. 8A where non-text information had been recognized, cut from the original image, and replaced by a solid color, according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

As discussed above, today's mobile devices are capable of capturing a photographic image of a document and processing the image through OCR, using either an OCR software running on a mobile device or an OCR service provided by an OCR server over a network. For enterprise applications where perfect or near perfect OCR results are desired or required, document images are often transmitted over a network so that a server machine with the necessary computational power can perform high quality OCR operations on the document images. Since high quality OCR operations often require high quality images, it can be difficult to increase network throughput, even when image compression is applied. One reason is that dense information, such as a barcode or a colorful photo, does not compress well. For example, Joint Photographic Expert Group (JPEG) is one of the most commonly used formats for storing images and photographs. JPEG compression can compress an image's file size down to five percent of its original size. However, due to the loss of actual content of the image, quality of the image is reduced after JPEG compression—a barcode pattern can be distorted and noise can be added to the barcode, which makes it very difficult to decode the actual content of the barcode.

To address these issues, embodiments disclosed here provide a new approach in which a partial recognition is performed on an image of a document captured by a mobile device prior to sending the image to a server for high quality OCR recognition. The partial recognition performed in the mobile device can advantageously reduce the image size and increase network throughput without sacrificing the quality of OCR results.

Figure 1:
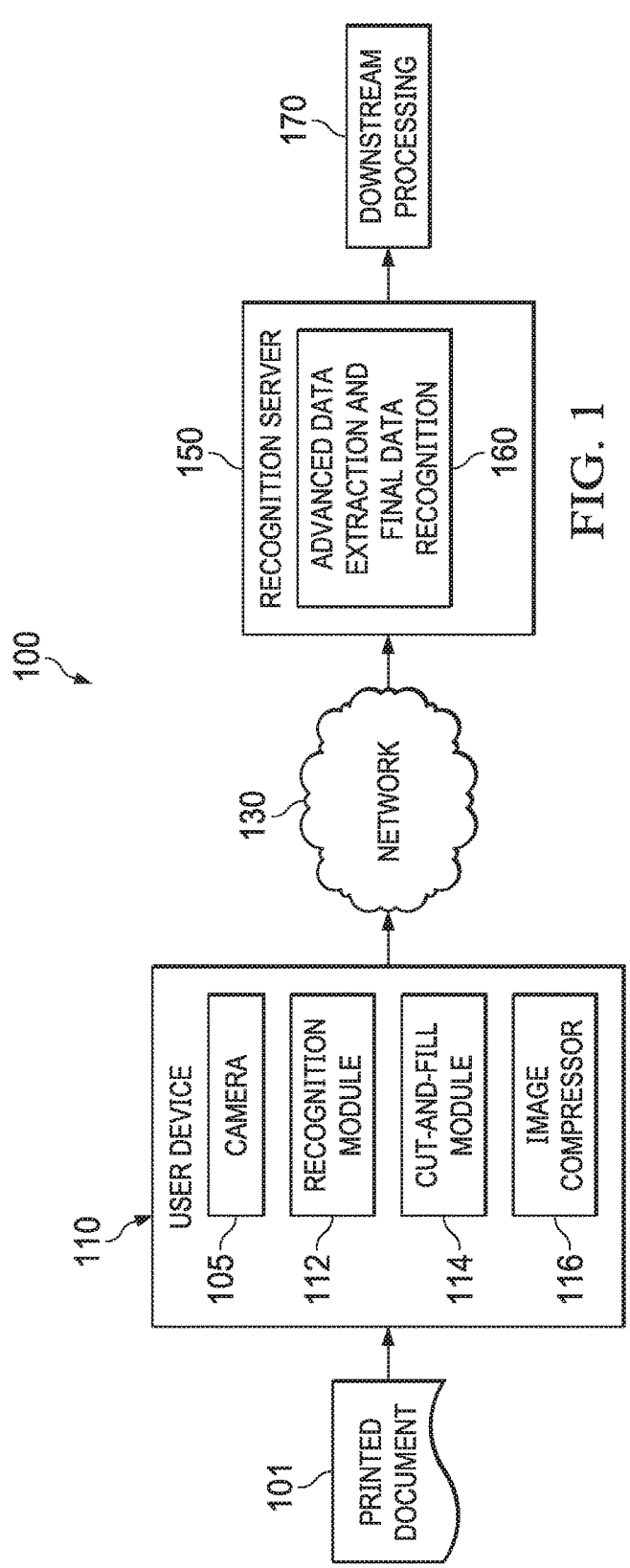
FIG. 1 depicts a diagrammatic representation of a network computing environment where embodiments of on-device partial recognition disclosed herein can be implemented.

FIG. 1 depicts a diagrammatic representation of a network computing environment where embodiments of on-device partial recognition disclosed herein can be implemented. As illustrated in FIG. 1, system 100 may include recognition module 112 and cut-and-fill module 114 running on user device 110. User device 110 may additionally have camera 105 and image compressor 116. Camera 105 may be used by a user to capture an image of printed document 101. Recognition module 112 may operate to recognize a portion of the image locally and cut-and-fill module 114 may operate to cut and fill the recognized portion of the image with a solid color to generate a modified image having a smaller image size than the original image of printed document 101. The size of the modified image may be further reduced by image compressor 116. Image compressor 116 may implement any suitable compression techniques, for instance, lossy compression (e.g., JPEG), lossless compression (e.g., Portable Network Graphics, Graphics Interchange Format, etc.), etc.

In the example of FIG. 1, user device 110 is communicatively connected to recognition server 150 over network 130. The modified image may be communicated from user device 110 over network 130 to recognition server 150 for remainder of processing by recognition server 150. For example, recognition server 150 may operate to perform advance data extraction and final data recognition 160. In some embodiments, recognition server 150 may provide results from advance data extraction and final data recognition 160 to a computing facility for downstream processing 170. In some embodiments, recognition server 150 may provide results from advance data extraction and final data recognition 160 to user device 110.

Figure 2:
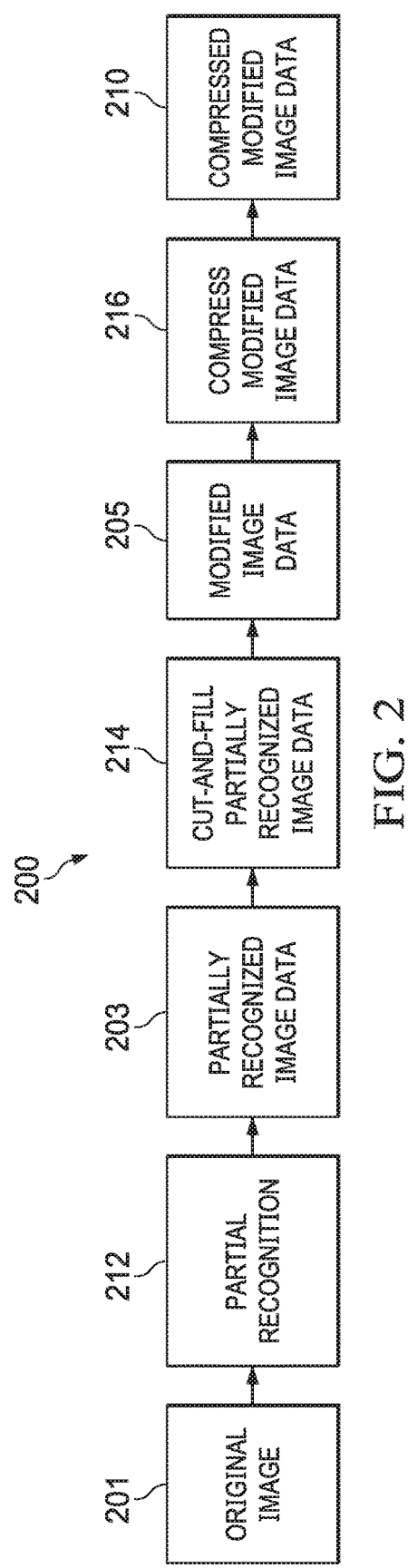
FIG. 2 depicts a flow diagram illustrating an example of an image being processed with on-device partial recognition on a mobile device according to some embodiments.

FIG. 2 depicts a flow diagram illustrating an example of an image being processed with on-device partial recognition on a mobile device according to some embodiments. As illustrated in FIG. 2, process 200 may include original image 201 being examined for partial recognition (212). Original image 201 may be an image of a document. Examples of such a document can include boarding passes, licenses, brochures, letters, etc. of various types and sizes. As explained below, at partial recognition 212, certain information such as a barcode or UPC symbol contained in original image 201 that may be processed locally is recognized. For example, suppose original image 201 is an image of a driver's license with a barcode portion and a text layout portion. The barcode is recognized at partial recognition 212, resulting in partially recognized image data 203. The recognized barcode can be processed locally to generate an associated identifier tag or numerical code.

Partially recognized image data 203 can then be processed to cut or block out the recognized barcode and fill it with a single solid color (214), resulting in modified image data 205. As an example, the single solid color can be white, although any solid color (e.g., black, gray, blue, green, red, etc.) will work. The replacement of the barcode with a solid color effectively reduces the image size. Thus, modified image data 205 is noticeably smaller than original image 201. However, the reduction in image size does not adversely affect the quality of modified image data 205. This is because the partially recognized data (which, in this example, is a barcode) has been processed and the necessary information associated with the partially recognized data has been extracted (which, in this example, is the identifier tag or numerical code represented by the barcode in the document). Thus, no crucial information necessary for high quality OCR (e.g., image-to-text detection, recognition, and extraction) is lost.

In some embodiments, modified image data 205 can be compressed (216) to further reduce image size, resulting in compressed modified image data 210. At this time, process 200 ends and compressed modified image data 210 is ready for transmission to the server side for further processing (e.g., high quality OCR, text extraction, content analysis, document conversion, document management, archiving, etc.). In an ideal world, a mobile device should be able to run image-to-text recognition algorithms to accurately extract text directly on the mobile device. However, perfect recognition and extraction with 100% accuracy is currently not possible to be done on mobile devices. As a result, many enterprise applications rely on recognition servers to perform high quality OCR. Such recognition servers can achieve speed and accuracy rates that cannot be matched by mobile devices. However, sending images to recognition servers over a network can be a time consuming process. Process 200 can significantly reduce the size of an image on a mobile device before the image is sent to a server. Depending upon location and area size, the reduction in image size can be significant. The reduction in image size, in turn, can reduce network traffic and hence increase network throughput for a client-server recognition process that leverages on-device partial recognition disclosed herein.

Figure 3:
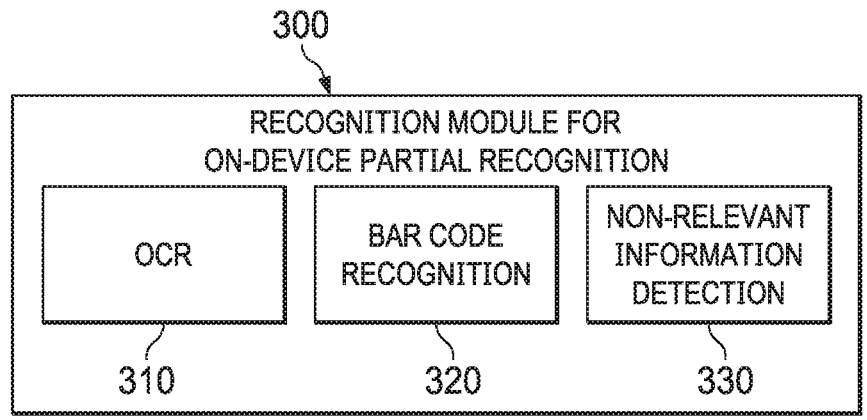
FIG. 3 depicts a diagrammatic representation of an exemplary recognition module according to some embodiments.

In some embodiments, on-device partial recognition can be configurable for detecting and recognizing varying types of information from document images. To this end, FIG. 3 depicts a diagrammatic representation of an exemplary recognition module according to some embodiments. Recognition module 300 is particularly configured with various tools or functions 310, 320, 330 for on-device partial recognition. In some embodiments, an application running on a user device may implement recognition module 300 as a tool box presented on a user interface of the application. In such semi-automated implementations, a user may configure how on-device partial recognition is to be performed on the user device. For example, if the user only wants a quick scan and accuracy is not a concern (i.e., the quality of words to discard can be very low, since high quality processing is done at the server side), the user may select function 310 to perform an OCR operation on an image of a document that the user captured using a camera on the user device. Likewise, if barcode recognition is desired, the user may select function 320. If non-relevant information detection is desired, the user may select function 330. Further, the user may select a type of document supported by the application (e.g., "This is a boarding pass") and recognition module 300 then operates to detect non-relevant information based on user-provided information on the type of document being processed. The functions of recognition module 300 are not mutually exclusive and the user may select multiple functions of recognition module 300.

Function 310 may implement any suitable mobile OCR technologies currently available on the market. Function 320 may implement any suitable barcode detection and recognition techniques and algorithms currently available on the market or developed using, for example, Radon transformation. Function 330 may implement any suitable information detection and recognition techniques and algorithms currently available on the market or developed using, for instance, machine learning (ML).

In ML, models can be trained to recognize certain information (e.g., a brand logo, a word, a phrase, a picture, etc.) and, once trained, deployed to run on a mobile device. A ML engine may search for patterns or "anchors" in an image and pass the information to the cut-and-fill module. What gets returned by such an ML engine may depend on the particular ML implementation. For example, the ML engine may return a polygon, a boundary, or a region that contains a string of text that it recognizes. Alternatively or additionally, the ML engine may return a map indicating pixels to be blanked out. In that case, an extra step is performed to identify a polygon that contains those pixels. That is, the ML engine may return information that can be processed into a single region which the next module (e.g., cut-and-fill module 114) can cut and fill with a solid color. As an example, "DeepLogo" is a brand logo detection system that uses region-based convolutional neural networks in Tensorflow™ (which is an open source software library for numerical computation using data flow graphs) to detect and classify bran logos in images. Many ML implementations can be leveraged to detect and learn words and phrases that may be excluded from images.

Variations of functions 310, 320, and 330 may also be possible. For example, function 310 may provide different OCR resolution settings; function 320 may provide different barcode recognitions, and function 330 may provide various types of non-relevant information detection (e.g., logos, words, phrases, etc.). Additionally, function 330 may be configured for text detection only. In such cases, all non-text information is excluded (i.e., cut or blocked from the image and replaced with a single solid color), leaving detected text fields in the image for server-side recognition.

In some embodiments, an application running on a user device may implement recognition module 300 as part of the application that is automatically triggered when an image of a document is captured by the user device. Whether the partial recognition is fully automated or semi-automated can depend on specific implementation. In fully automated implementations, a function of recognition module 300 may operate to first detect the type of document and send the detected information (e.g., document type) to the next function for partial recognition, described below with reference to FIG. 4.

Figure 4:
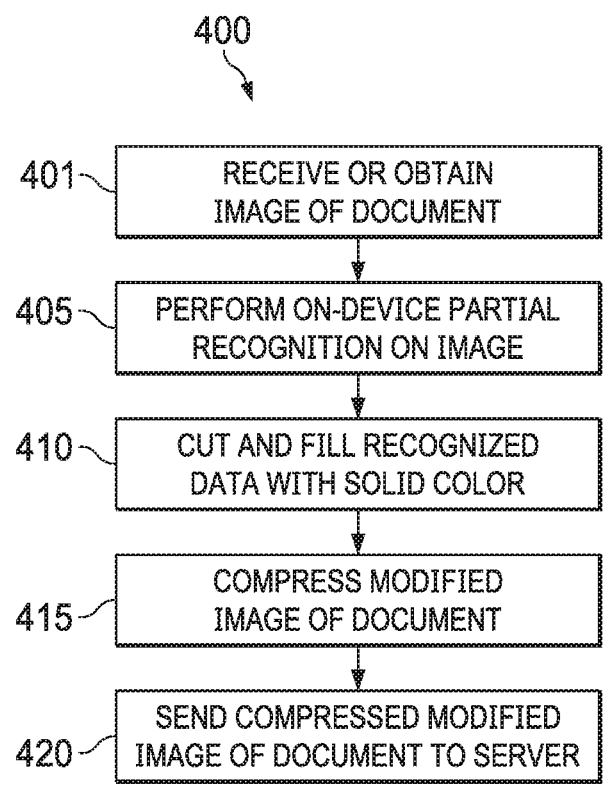
FIG. 4 is a flow chart illustrating an example of an on-device partial recognition method according to some embodiments.

FIG. 4 is a flow chart illustrating an example of an on-device partial recognition method according to some embodiments. Method 400 may begin when an original image of a document is received or obtained (401), which automatically triggers on-device partial recognition in a client-server process. Method 400 may include performing a partial recognition on the original image (405). As discussed above, the partial recognition may be performed by a recognition module running on a user device to produce recognized image data. Depending upon use cases, the recognized image data produced by the recognition module may include a portion of the image containing a barcode printed on the document, any non-relevant information (e.g., a word, a phrase, etc.), any non-text information (e.g., a logo, a photo, a drawing, etc.), or a combination thereof.

In some embodiments, the recognition module may send the recognized image data to a cut-and-fill module running on the user device. Method 400 may further comprise, cutting, by the cut-and-fill module, the portion of the image containing the barcode from the image and filling the portion of the image with a solid color (410) to produce a modified image of the document. The cut-and-fill module may send the modified image of the document to an image compressor running on the user device. Method 400 may further comprise compressing, by the image compressor, the modified image of the document to produce a compressed modified image of the document (415). Finally, method 400 may include sending the compressed modified image of the document to a recognition server over a network connection (420). In some embodiments, the recognition server is operable to perform an image-to-text recognition on the compressed modified image of the document and either send a result from the image-to-text recognition to a downstream computing facility for further processing or return the result from the image-to-text recognition to the user device.

The on-device partial recognition method described above is directed to removing recognized information and/or non-relevant information from an image and filling the removed portion(s) with a solid color to reduce image size (with or without compression). In some cases, so long as certain information (e.g., a barcode, a logo, a word, a phrase, etc.) can be detected for exclusion, sophisticated recognition need not be performed. This is illustrated in FIG. 5.

Figure 5:
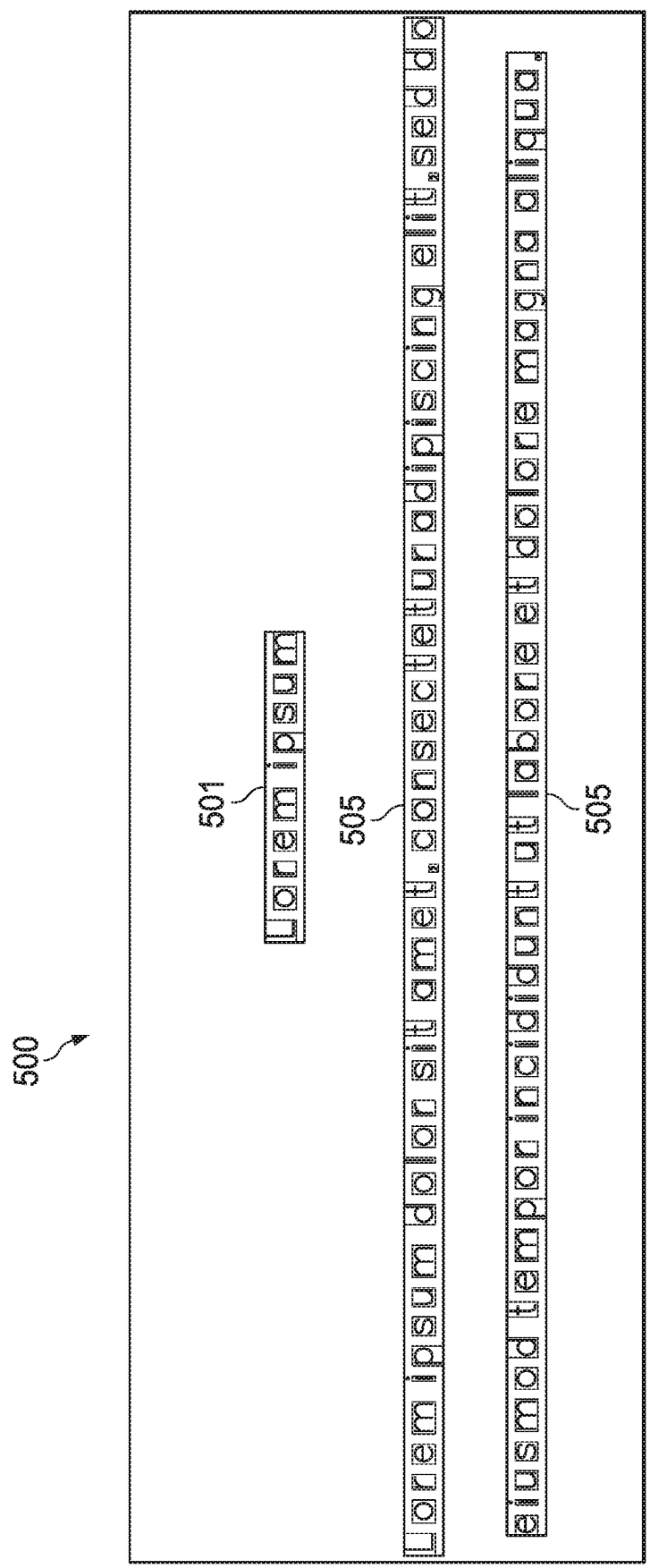
FIG. 5 shows a document image with detected regions, illustrating an example of text detection that can be performed on a mobile device.

FIG. 5 shows a document image with detected regions, illustrating an example of text detection that can be performed on a mobile device. In this example, characters for a word are detected individually, but not recognized. A polygon (e.g., rectangle box 501) can be defined based on the over size of the characters detected, regardless of the meaning of the word. Likewise, characters for a phrase, or phrases, can be detected individually, including white spaces between words, and a polygon or polygons (e.g., rectangle boxes 505) can be defined based on the over size of the characters detected, regardless of the meaning of the phrase(s). This text detection technique can be utilized to detect text fields in a document and block out any non-text information in the image of the document, if only textual information is desired or needed.

FIG. 6A shows an example of an image of a type of document that may contain different types of information. For instance, a boarding pass may include textual information and a barcode. FIG. 6B shows a modified image of FIG. 6A where the barcode had been recognized (e.g., area 605), cut from the original image, and replaced by a solid color (e.g., white), according to some embodiments. The image in FIG. 6A has an image size of 692 KB. After the on-device partial recognition and the cut-and-fill operation, the modified image in FIG. 6B has an image size of 616 KB. Both images in FIGS. 6A and 6B are equal by compression type and format. In the example of FIG. 6B, an information package from the client side to the server side will contain the modified image plus few bytes of recognized information associated with the barcode. This leads to reducing overall data transfer time.

FIG. 6C shows a modified image of FIG. 6A where, in addition to the barcode, non-relevant text "MAKE SURE YOU BOARD BEFORE GATE CLOSURE. CHECK MONITORS" had been recognized (e.g., area 607), cut from the original image, and replaced by a solid color (e.g., white), according to some embodiments. As a non-limiting example, the on-device OCR can be used to detect text that can be removed from the image. In some embodiments, this can be achieved using a set of rules to perform a "fuzzy matching." The steps in this OCR scenario can include performing OCR on the image, to find the content and placement of lines of text. As on-device OCR is often of reduced quality, this may return phrases like "MARE SU?E YOU" and "ETKT: 074I30?OOO" where the "?" represent unknown characters and the bold characters were read incorrectly. Using rules that specify words, phrases, and/or patterns, text that is considered non-relevant can be identified. The rules do "fuzzy matching" so that the specified words, phrase, and/or patterns need not be exact, so long as they are similar to what's defined in the rules. This takes into account the OCR errors. In the above example, a rule might specify "The phrase 'MAKE SURE YOU' is not relevant". This matches the first of the two example phrases. Following the barcode and neural network examples, the text for the non-relevant content (which is represented by area 607 shown in FIG. 6C) is replaced with a solid color, as shown in FIG. 6C. The modified image in FIG. 6C has an image size of 584 KB, with the same compression type and format as the original image in FIG. 6A. The results are listed in Table 1.

TABLE 1

| Modification | Image size | Reduction in image size | Estimated size of transferred data. Including image and recognized data |
| --- | --- | --- | --- |
| Original image | 692 KB | — | 692.000 KB |
| Removing recognized area | 616 KB | 11% | 616.050 KB |
| Removing recognized and non-relevant area | 584 KB | 16% | 585.40 |

The resulting image is sent to the server for higher-quality extraction. In the example, the text that the device read as "ETKT: 074I30?OOO" may be correctly read on the server as "ETKT: 0741303000".

Aligned with other image enhancement and processing methods, on-device partial recognition may make extremely high image compression possible. FIG. 6D shows a modified image of FIG. 6A where image enhancement(s) (e.g., the letters are bolder, the background is cleaner, the contrast is higher, the image is sharper and/or less noisy, etc.) had been applied in addition to the barcode being recognized, cut from the original image, and replaced by a solid color (e.g., white), according to some embodiments.

Embodiments of the on-device partial recognition approach described herein can be implemented in many ways. For example, the approach can be implemented in software development kits (SDKs) for distributed capture (through client applications) and centralized recognition (by a recognition server). Further, the approach can be implemented in server-to-server operations. For example, a first server machine implementing a recognition module described above may run partial recognition to detect barcodes (and/or non-relevant information) from images, decode the barcodes, cut them from the original images, fill the recognized areas with a solid color, and send the modified images (with reduced image sizes and recognized data) to another server machine for further processing such as high quality recognition and advanced text extraction.

Figure 7A:
FIG. 7A shows an image of a type of document that may contain textual information and multiple barcodes.

The savings in image size and hence the increase in network throughput may vary depending upon the types of documents and the types of information contained therein. FIG. 7A shows an example of an image from an image base containing captured images of driver licenses. As illustrated in FIG. 7A, each license may contain textual information and multiple barcodes. In some cases, a batch processing application implementing the partial recognition approach disclosed herein may be run on a computing device to recognize the barcodes from the images in the image base, cut them from the original images, and fill the recognized area(s) with a solid color. In some embodiments, the batch processing application may utilize a predefined template to recognize images for partial on-device processing (e.g., driver's license template, price tag template, etc.).

Figure 7B:
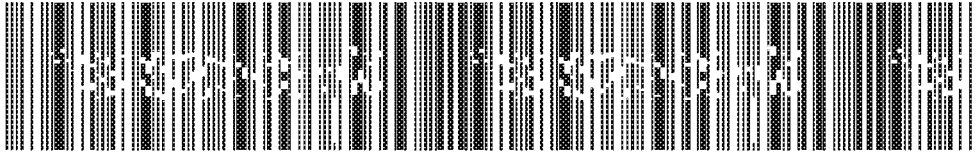
FIG. 7B shows a modified image of FIG. 7A where the barcodes had been recognized, cut from the original image, and replaced by a solid color, according to some embodiments.

A non-limiting example of a resulting modified image is shown in FIG. 7B, with areas 705 and 707 representing where two barcodes had been recognized and cut from an original image and filled in with a solid color (e.g., white in this example). Table 2 below shows that the partial recognition thus performed on 16 images in the image base can result in 15% of image size reduction. Table 2 does not contain information about size of the recognized data because the size is so small that it can be negligible.

TABLE 2

| Number of images in image base | Original size | After partial recognition | Ratio |
| --- | --- | --- | --- |
| 16 | 18 472 KB | 15 751 KB | 15% |

FIG. 8A shows an image of a type of document that may contain multiple types of information, for instance, textual information, a barcode, and a logo. In some embodiments, a partial recognition operation may be performed on the image to recognize the barcode (e.g., through barcode recognition) and the logo (e.g., through brand logo detection). The recognized areas are then removed (cut) from the image and filled with a solid color (e.g., white). In some embodiments, a partial recognition operation may be performed on the image to detect text only and all non-text information is blocked (cut) from the image and filled with a solid color.

FIG. 8B shows a modified image of FIG. 8A where the logo (which is represented by area 805) and the barcode (which is represented by area 807) had been recognized, cut from the original image, and replaced by a solid color, according to some embodiments. In this case, the modified image is sent to the server with the recognized data associated with the barcode and the logo. When text detection is performed to cut non-text information from an image, no recognized data is sent to the server with the modified image. In a worst case scenario (e.g., the type of document cannot be recognized or no information could be detected or recognized), the original image is sent, without modification, to the backend for processing.

Figure 9:
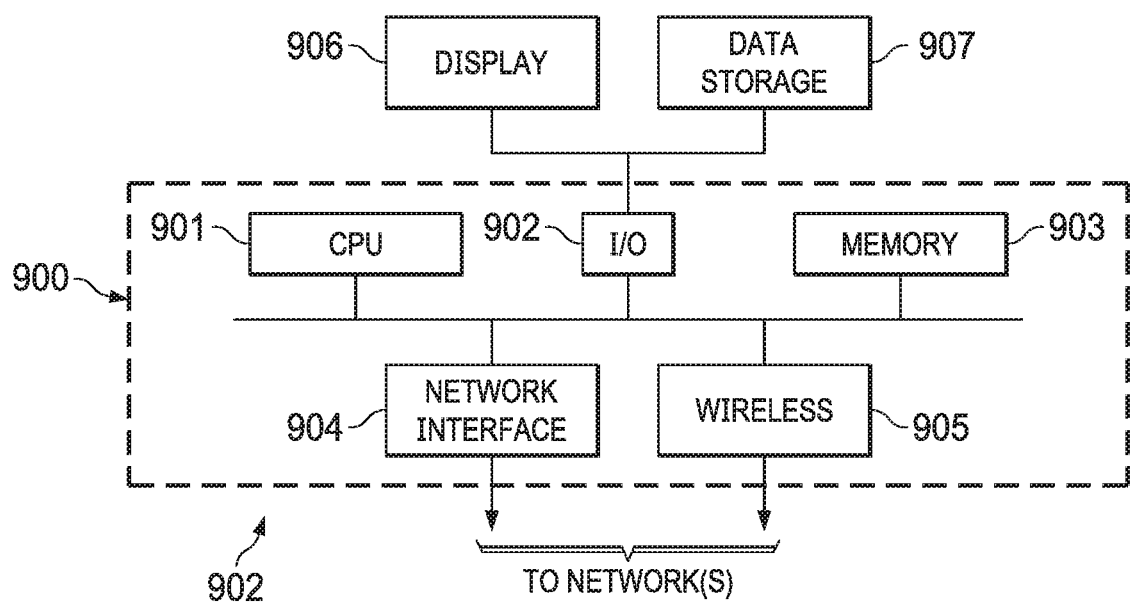
FIG. 9 depicts a diagrammatic representation of an example of a data processing system embodying an example of an ingestion pipeline disclosed herein.

FIG. 9 depicts a diagrammatic representation of a data processing system for implementing a system for processing messages. As shown in FIG. 9, data processing system 900 may include one or more central processing units (CPU) or processors 901 coupled to one or more user input/output (I/O) devices 902 and memory devices 903. Examples of I/O devices 902 may include, but are not limited to, keyboards, displays, monitors, touch screens, printers, electronic pointing devices such as mice, trackballs, styluses, touch pads, or the like. Examples of memory devices 903 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 900 can be coupled to display 906, information device 907 and various peripheral devices (not shown), such as printers, plotters, speakers, etc. through I/O devices 902. Data processing system 900 may also be coupled to external computers or other devices through network interface 904, wireless transceiver 905, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, a WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such a computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will also be appreciated that one or more of the elements depicted in the drawings/figures in the accompanying appendices can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. The scope of the present disclosure should be determined by the following claims and their legal equivalents.

What is claimed is:

1. A method for on-device partial recognition, the method comprising:
    performing, by a recognition module running on a user device, an image recognition on an image of a document, the image recognition producing recognized image data, the recognized image data comprising a portion of the image of the document;
    providing, by the recognition module, the recognized image data to a cut-and-fill module running on the user device;
    cutting, by the cut-and-fill module, pixels of various colors from the portion of the image;
    filling, by the cut-and-fill module, the portion of the image cut from the document with pixels of a single color, the cutting and the filling producing a modified image of the document;
    compressing, by an image compressor running on the user device, the modified image of the document, the compressing producing a compressed modified image of the document; and
    sending the compressed modified image of the document to a recognition server computer for server-side processing of the compressed modified image of the document.

2. The method according to claim 1, further comprising:
    detecting, by the recognition module, non-relevant information in the image of the document;
    providing the non-relevant information in the image of the document detected by the recognition module to the cut-and-fill module;
    cutting, by the cut-and-fill module, the non-relevant information from the image of the document; and
    filling, by the cut-and-fill module, the non-relevant information cut from the document with pixels of the single color.

3. The method according to claim 2, wherein the non-relevant information in the image of the document comprises textual information, non-textual information, or a combination thereof.

4. The method according to claim 1, wherein portion of the image of the document comprises a barcode, text, word, number, symbol, icon, or a combination thereof.

5. The method according to claim 4, further comprising:
    processing, by the recognition module running on the user device, the barcode; and
    generating an associated identifier tag or numerical code corresponding to the barcode.

6. The method according to claim 5, further comprising:
    sending the associated identifier tag or numerical code corresponding to the barcode with the compressed modified image of the document to the recognition server computer adapted for performing an image-to-text recognition on the compressed modified image of the document.

7. The method according to claim 1, wherein the server-side processing of the compressed modified image of the document comprises an optical character recognition, text extraction, content analysis, document conversion, document management, archiving, or a combination thereof.

8. An apparatus for on-device partial recognition, the apparatus comprising:
a processor;
a non-transitory computer-readable medium; and
stored instructions translatable by the processor for:
performing an image recognition on an image of a document, the image recognition producing recognized image data, the recognized image data comprising a portion of the image of the document;
cutting pixels of various colors from the portion of the image;
filling the portion of the image cut from the document with pixels of a single color, the cutting and the filling producing a modified image of the document;
compressing the modified image of the document, the compressing producing a compressed modified image of the document; and
sending the compressed modified image of the document to a recognition server computer for server-side processing of the compressed modified image of the document.

9. The apparatus of claim 8, wherein the stored instructions are further translatable by the processor for:
detecting non-relevant information in the image of the document;
cutting the non-relevant information from the image of the document; and
filling the non-relevant information cut from the document with pixels of the single color.

10. The apparatus of claim 9, wherein the non-relevant information in the image of the document comprises textual information, non-textual information, or a combination thereof.

11. The apparatus of claim 8, wherein portion of the image of the document comprises a barcode, text, word, number, symbol, icon, or a combination thereof.

12. The apparatus of claim 11, wherein the stored instructions are further translatable by the processor for:
processing the barcode; and
generating an associated identifier tag or numerical code corresponding to the barcode.

13. The apparatus of claim 12, wherein the stored instructions are further translatable by the processor for:
sending the associated identifier tag or numerical code corresponding to the barcode with the compressed modified image of the document to the recognition server computer adapted for performing an image-to-text recognition on the compressed modified image of the document.

14. The apparatus of claim 13, wherein the server-side processing of the compressed modified image of the document comprises an optical character recognition, text extraction, content analysis, document conversion, document management, archiving, or a combination thereof.

15. A computer program product for on-device partial recognition, the computer program product comprising a non-transitory computer-readable medium storing instructions translatable by a processor for:
performing an image recognition on an image of a document, the image recognition producing recognized image data, the recognized image data comprising a portion of the image of the document;
cutting pixels of various colors from the portion of the image;
filling the portion of the image cut from the document with pixels of a single color, the cutting and the filling producing a modified image of the document;
compressing the modified image of the document, the compressing producing a compressed modified image of the document; and
sending the compressed modified image of the document to a recognition server computer for server-side processing of the compressed modified image of the document.

16. The computer program product of claim 15, wherein the instructions are further translatable by the processor for:
detecting non-relevant information in the image of the document;
cutting the non-relevant information from the image of the document; and
filling the non-relevant information cut from the document with pixels of the single color.

17. The computer program product of claim 16, wherein the non-relevant information in the image of the document comprises textual information, non-textual information, or a combination thereof.

18. The computer program product of claim 15, wherein portion of the image of the document comprises a barcode, text, word, number, symbol, icon, or a combination thereof.

19. The computer program product of claim 18, wherein the instructions are further translatable by the processor for:
processing the barcode; and
generating an associated identifier tag or numerical code corresponding to the barcode.

20. The computer program product of claim 19, wherein the instructions are further translatable by the processor for:
sending the associated identifier tag or numerical code corresponding to the barcode with the compressed modified image of the document to the recognition server computer adapted for performing an image-to-text recognition on the compressed modified image of the document.

* * * * *